Nov. 2, 1971  R. W. DECKER ET AL  3,616,701
ONE-PIECE CROSSHEAD INCORPORATING A HYDRODYNAMIC BEARING
Filed Sept. 17, 1969
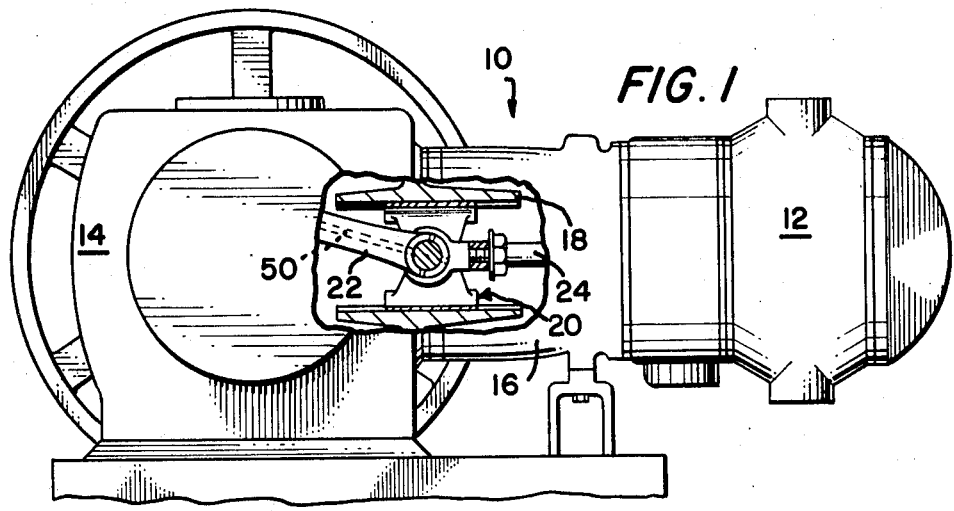
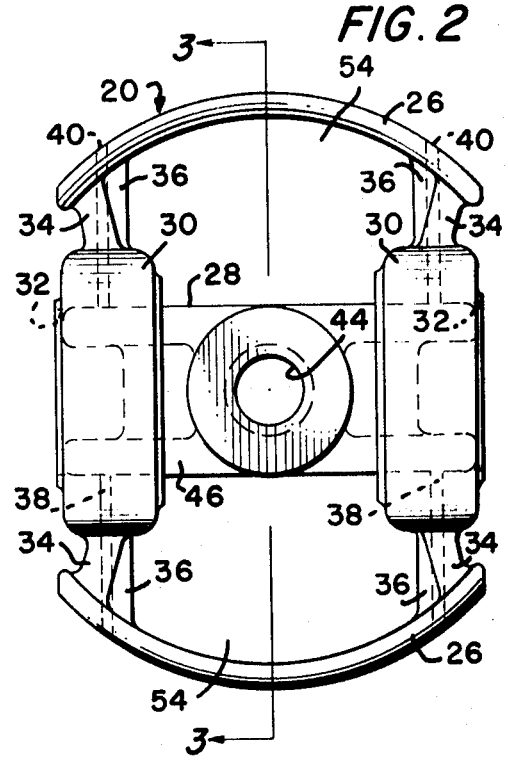
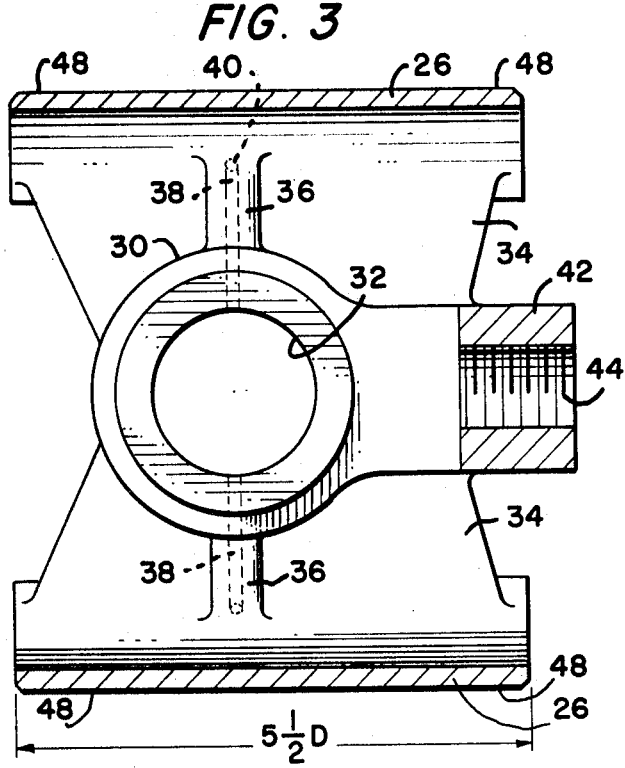
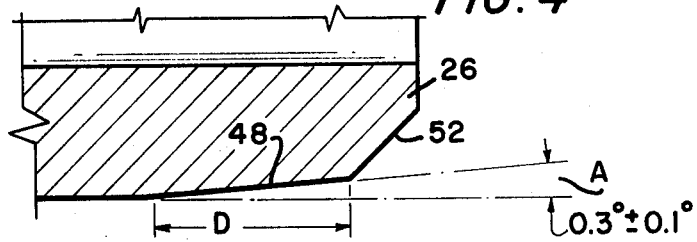
INVENTORS
ROBERT W. DECKER
FRANK D. HOWE
BY
Bernard J. Murphy
AGENT

United States Patent Office 3,616,701
Patented Nov. 2, 1971

---

3,616,701
ONE-PIECE CROSSHEAD INCORPORATING A HYDRODYNAMIC BEARING
Robert W. Decker and Frank D. Howe, Painted Post, N.Y., assignors to Ingersoll-Rand Company, New York, N.Y.
Filed Sept. 17, 1969, Ser. No. 858,805
Int. Cl. F16h *21/22*
U.S. Cl. 74—44
13 Claims

ABSTRACT OF THE DISCLOSURE

One-piece, cast-iron crosshead, open-ended with throughgoing passages formed therein to avoid a "piston" effect with reciprocation of the casting. Either axial ends of the crosshead are of smaller outside or girth dimension than the intermediate portion, as the shoes have tapered areas at the ends. The tapered areas insure the maintenance of the lubricant-providing bearing, between the shoes and the crosshead guide, in cooperation with lubricant supplied therebetween.

---

This invention pertains to crossheads such as those used in a machine having a reciprocating connecting rod and piston rod, and a crosshead guide, and in particular to a crosshead having an enhanced bearing means therefor relative to the guide.

In the prior art, it is customary for crossheads to be provided with separable shoes, the shoes being made of non-ferrous metal or, alternatively the entire crosshead is made of such metal, these practices being used because the crosshead guide is typically a cast-iron component. The use of non-ferrous metals for sliding contact with the cast-iron guide will more readily accommodate lubrication therebetween. Typically it is unknown to run cast-iron crossheads on a cast-iron guide. In either circumstance, these prior art practices have proven to be considerably expensive. Also, in the prior art, it is common for crossheads to be closed at least at one end. But then, with the oscillation of the crosshead within the distance piece the closed end produces an unwanted piston effect.

It is an object of this invention, therefore, to provide an improved, one-piece crosshead for use in reciprocating machines having means for admitting lubricant between the integral shoes thereof and the crosshead guide together with means spacing surfacing of said crosshead, which interfaces said guide, from said guide for maintaining a hydrodynamic bearing of the shoes relative to the guide.

A feature of this invention comprises the provisioning of a one-piece, cast crosshead which is open-ended and has throughgoing passageways formed therein. Shoes integral with the casting are supported by webs extending from a centrally-formed clevis. Also, the shoes have tapers formed at either axial ends to inhibit the wiping away of lubricant from between the shoes and the crosshead guide and to promote the development of hydrodynamic pressure, thereby to provision a hydrodynamic bearing thereat.

Other objects and features of this invention will become more apparent by reference to the following description taken in conjunction with the accompanying figures, in which:

FIG. 1 is a side elevation, with the distance piece housing broken away, of a compressor assembly employing the novel crosshead;

FIG. 2 is an enlarged front elevation of the crosshead viewing the crosshead from the connecting rod end, and looking toward the piston rod end;

FIG. 3 is a longitudinal cross-section of our improved crosshead taken along section lines 3—3 of FIG. 2; and FIG. 4 is a fragmentary view greatly enlarged, of a terminal end of one of the shoes in which the taper of the shoe surfacing is illustrated.

Shown in FIG. 1 is a compressor assembly 10 which comprises a compressor gas end 12 and frame and running gear 14. The distance piece housing shell 16 is shown broken away so that it can be seen that a crosshead guide 18 is confined therein and slidably accommodates a crosshead 20 configured according to the teaching of our invention. A connecting rod 22 is coupled to the crosshead by means of a clevis assembly integral therewith, and a piston rod 24 is also coupled thereto and extends therefrom toward the compressor gas end 12.

As shown in FIG. 2, our improved crosshead 20 has integral shoes 26, and has a clevis assembly 28 formed centrally thereof. The clevis assembly 28 comprises a pair of oppositely disposed bosses 30 each of which is bored through at 32 for receiving a connecting rod crosshead pin. Four webs 34, each of which has a strut 36, support the shoes 26 about the clevis assembly 28. This configuration defines a "box structure" which reduces weight without sacrificing strength; the shoes 26 function as load members as well as bearing components. Each of the four struts 36 have drill holes formed therein which serve as lubricant passageways 38. The passageways 38 each open internally on bore 32 and externally, at 40, to provide a film of lubricant between the shoes 26 and the guide 18.

As FIG. 3 illustrates, the clevis assembly 28 has a piston rod connector 42 projecting rearwardly therefrom, and the connector has a tapped bore 44 for threadably coupling the piston rod 24 thereto. The clevis assembly carries the piston rod connector 42 on a ribbed support 46 which provides considerable structural strength, and assures a desired "straight" or rigid linearity of the piston rod. In FIGS. 3 and 4 it is shown that tapered surface ends 48, which are formed adjacent to both axial ends of both shoes 26 are provided to inhibit the wiping away of lubricant admitted between the shoes 26 and the guide 18. The taper which is shown at D extends for a distance which is substantially ⅙ the overall distance 5½D of the shoe 26, and has an angle A, of $0.3° \pm 0.1°$ of arc, along that distance.

A lubricant passageway 50 is formed in connecting rod 22, as shown in FIG. 1, in the manner well practiced in the prior art, and a lubricant pump (not shown) pressure-feeds the lubricant through passageway 50 to the crosshead pin; from there the lubricant travels through the passageways 38 to supply a film of lubricant between crosshead shoes 26 and the guide 18.

It is a teaching of our invention, then, to provide means spacing surfaces of the crosshead shoes 26 from the guide to assure the maintenance of this lubricant film. The crosshead 20, according to our disclosure, has the commonly practiced removed or broken sharp edge 52, which is shown more clearly in FIG. 4, but it has our novel improvement of the additional tapered surface ends 48. Thus, each shoe 26 comprises no less than five diverse plane surfaces, adjacent to the guide: surfaces 52, surfaces 48, and the linear surface between surfaces 48. Also according to our invention, the crosshead 20 is open therethrough. The webs 34 extend from the clevis assembly 28 to support the shoes 26 thereupon; the webs 34 define a plurality of throughgoing passageways 54 therebetween providing the crosshead with means which avoid the generation of a piston effect.

The tapered surface ends 48 cause the crosshead 20 to "skim" upon the lubricant film, and inhibit the wiping away of the film from the surfaces of the guide 18.

Therefore, the crosshead 20, in this embodiment of our invention, is formed wholly of cast iron, and reciprocates within the guide 18—which is also wholly formed of cast iron—and there is maintained an excellent hydrodynamic bearing between the two components. The tapered surface ends 48, the same being means which space some one-third of the guided surface of the shoes 26 from the guide, preserves the lubricant-provisioned bearing of the crosshead. Thus, the economies offered by avoiding the use of separate non-ferrous shoes, or by not having to form the whole crosshead 20 of non-ferrous metal, can be realized.

While we have described our invention in connection with a specific embodiment thereof, it is to be clearly understood that this is done only by way of example and not as a limitation to the scope of our invention.

We claim:

1. A machine comprising a reciprocating connecting rod and piston rod and a cast iron crosshead guide, a crosshead, intercoupling said rods,
   a one-piece iron casting disposed for movement relative to said guide;
   said casting having not more than two oppositely disposed wall surfaces slidably engaged with surfaces of said guide;
   means for admitting lubricant between said wall surfaces and said guide surfaces for providing a film of lubricant thereat; and
   said wall surfaces having substantial areas thereof which define means spacing said casting from said guide surfaces; and wherein
   said spacing means is cooperative with said lubricant-admitting means for causing said wall surfaces to skim upon, and to insure the maintenance of, said film, to effect the preservation of a hydrodynamic bearing between said casting and said guide.

2. A machine, according to claim 1, wherein:
said casting has means defining unobstructed, through-going passages which extend, longitudinally, parallel with the axis of crosshead movement, to avoid the generation of a piston effect by said crosshead upon movement thereof.

3. A machine, according to claim 1, wherein:
said casting has wall members which comprise integral shoes having given longitudinal dimensions,
said members having surfaces which comprise said wall surfaces, and
said wall surfaces extend along at least five diverse planes.

4. A machine, according to claim 3, wherein:
at least four of said planes are transverse to the longitudinal axis of said casting.

5. A machine, according to claim 3, wherein:
said casting comprises a clevis assembly having a plurality of webs which supports said wall members thereupon, said webs define unobstructed, through-going passages therebetween, and said passages extend parallel with the axis of crosshead movement to avoid the generation of a piston effect by said crosshead upon movement thereof.

6. A machine, according to claim 5, wherein:
said webs extend from the clevis assembly which is formed centrally of said casting, and said clevis assembly has a threaded connector projecting therefrom for the coupling of said piston rod thereto.

7. A machine, according to claim 5, wherein:
said lubricant-admitting means comprise borehole passageways formed in said webs, said passageways each opening on said wall surfaces and said clevis at either ends thereof.

8. A machine, according to claim 1, wherein:
said wall surfaces comprising wall members which comprise integral shoes, and each of said shoes has at least four uniformly dimensionally-varying, cross-sectional areas.

9. A machine, according to claim 4, wherein:
at least two of said planes lie on an angle, relative to said axis, of not less than 0.2 and not more than 0.4 degree of arc.

10. A machine, according to claim 4, wherein:
at least two of said planes each extend more than one-sixth the longitudinal dimension of said shoes.

11. A machine, according to claim 1, wherein:
said spacing means comprise tapered surfacing of said wall surfaces, adjacent at least one longitudinal, terminal end of said wall surfaces;
said tapered surfacing defining at least one uniformly, dimensionally-varying cross-sectional area of said casting thereat.

12. A machine, according to claim 11, wherein:
said spacing means comprise a plurality of tapered surfacings of said wall surfaces, at least one of said surfacings subsisting adjacent to each of the opposite, longitudinal, terminal ends of said wall surfaces.

13. A machine, according to claim 1, wherein:
said substantial areas comprise at least one-third of said wall surfaces.

References Cited
UNITED STATES PATENTS

| | | | |
|---|---|---|---|
| 1,891,973 | 12/1932 | Ellis | 308—3 |
| 2,322,004 | 6/1943 | Fast | 308—73 |

MARTIN P. SCHWADRON, Primary Examiner

B. GROSSMAN, Assistant Examiner

U.S. Cl. X.R.

184—5; 308—3 CH

PO-1050
(5/69)

UNITED STATES PATENT OFFICE
CERTIFICATE OF CORRECTION

Patent No. 3,616,701   Dated November 2, 1971

Inventor(s) R. W. Decker, Frank D. Howe

It is certified that error appears in the above-identified patent and that said Letters Patent are hereby corrected as shown below:

Column 3, line 19, "a cross-" should read
    --and an improved cross--.

Column 3, line 20, following "rods," insert
    --comprising:--.

Column 4, line 24, "degree" should read
    --degrees--.

Column 4, line 26, "extend" should read
    --extends--.

Signed and sealed this 15th day of August 1972.

(SEAL)
Attest:

EDWARD M.FLETCHER,JR.        ROBERT GOTTSCHALK
Attesting Officer            Commissioner of Patents